United States Patent

[11] 3,585,290

[72] Inventor Robert F. Sanford
Princeton Junction, N.J.

[21] Appl. No. 701,441
[22] Filed Jan. 29, 1968
[45] Patented June 15, 1971
[73] Assignee RCA Corporation

[54] CODING ARRANGEMENTS FOR MULTIPLEXED MESSAGES
10 Claims, 5 Drawing Figs.

[52] U.S. Cl. .......... 178/5.6
[51] Int. Cl. .......... H04n 7/08
[50] Field of Search .......... 178/6.8, 5.6, 5.8, 6 TM, 6 F&M

[56] References Cited

UNITED STATES PATENTS

| | | | |
|---|---|---|---|
| 3,469,032 | 9/1969 | Dorsey et al. .......... | 178/5.6 |
| 3,472,962 | 10/1969 | Sanford .......... | 178/5.6 |
| 3,491,199 | 1/1970 | Weinstein et al. .......... | 178/5.6 |
| 3,493,674 | 2/1970 | Houghton .......... | 178/5.6 |

*Primary Examiner*—Richard Murray
*Assistant Examiner*—John C. Martin
*Attorney*—Eugene M. Whitacre

ABSTRACT: Apparatus for extending the range of use of a television message system of the type wherein auxiliary message signals are multiplexed with regular program signals during the vertical blanking interval thereof, at a rate of one signal line per message per field of program information. Coding arrangements assign to each transmitted message a code signal of predetermined frequency and a predetermined time within the vertical blanking interval in which the message signals are to be inserted, and further condition selective recording of such auxiliary information upon receipt of message signals having a scheduled frequency and a scheduled interval location.

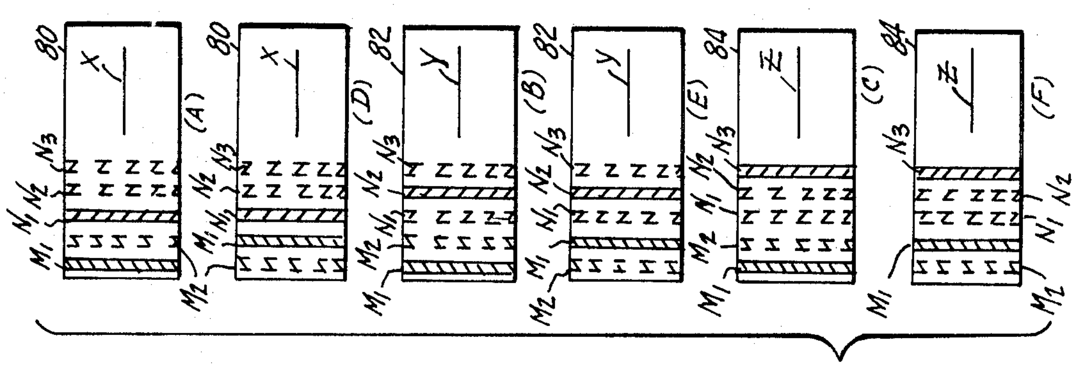
Fig. 7.
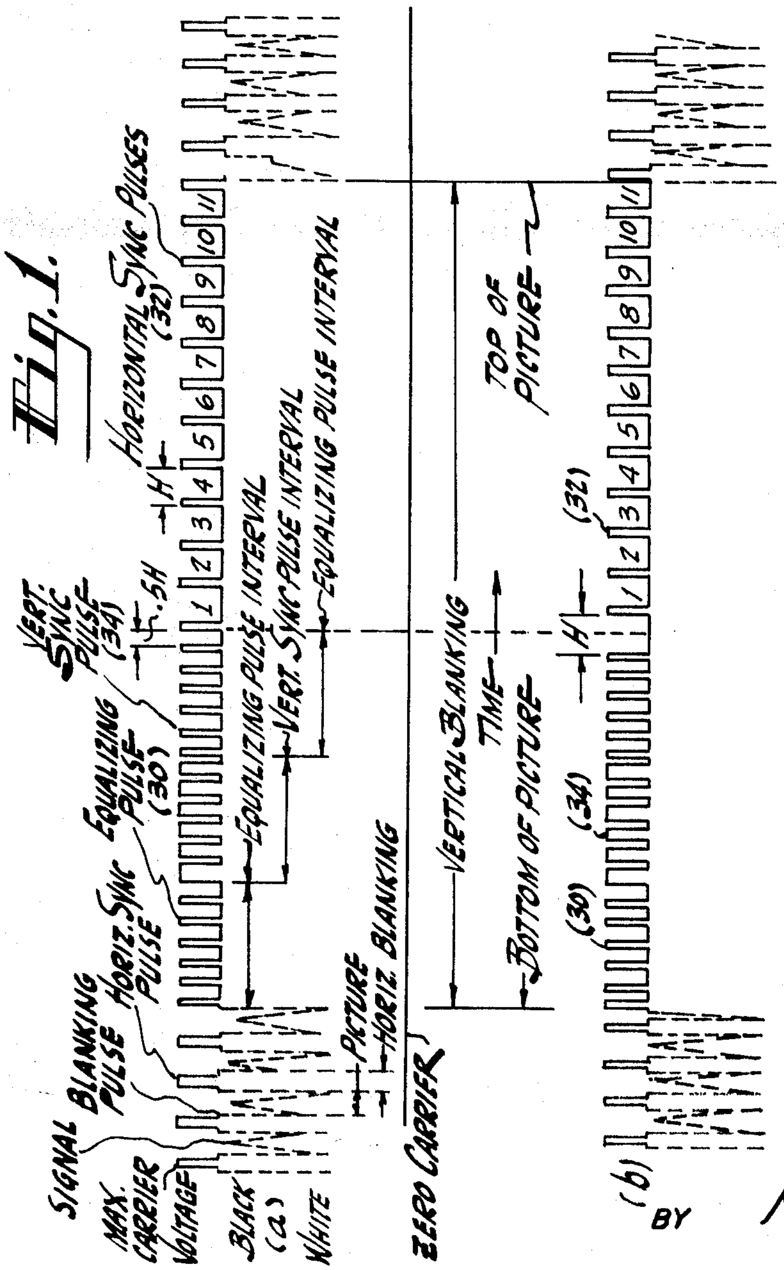
INVENTOR
ROBERT F. SANFORD
BY Charles Brodsky
ATTORNEY

INVENTOR:
ROBERT F. SANFORD

BY Charles Brodsky
ATTORNEY

INVENTOR:
ROBERT F. SANFORD
BY Charles Brodsky
ATTORNEY

CODING ARRANGEMENTS FOR MULTIPLEXED MESSAGES

This invention relates to the transmission of special message information to the public using existing television facilities, without interfering with regular television program service.

A system which accomplishes such transmission is disclosed in pending application, Ser. No. 551,084, filed May 18, 1966, and entitled "Television Message System," now U.S. Pat. No. 3,493,674.One embodiment of the system therein described sequentially multiplexes message representative line scan video signals developed by an auxiliary pickup camera with primary program video signals by a studio pickup camera during predetermined portions of the vertical blanking interval thereof, at a rate of one line scan signal per message per field of program information. More particularly, these video signals are inserted during a time interval corresponding to that between successive horizontal synchronizing pulses within the vertical blanking interval of each program field. The composite signal is then transmitted to the home receiver in the usual manner, where apparatus is additionally included to separate the message signals from the rest of the received signal. The separated message signals may be recorded using a thin-window-type cathode-ray tube and an associated Electrofax printer, while the primary program signals are displayed on the kinescope of the home receiver in the conventional way. As is described in U.S. Pat. No. 3,493,674, the thin window tube displays one horizontal line of message information, which is printed on the advancing paper of the Electrofax printer. Since the kinescope of the home receiver is cut off during the vertical blanking interval, the message information included therein is not displayed and thus does not interfere with the regular program picture as seen by the viewer.

U.S. Pat. No. 3,493,674 additionally discloses the use of category code signals. These code signals are also transmitted during the vertical blanking interval, and identify the transmitted message informations as to type. These signals permit the home viewer to condition his receiving unit so as to respond only to those code signals which tag the messages that are of particular interest to him.

It is an object of the present invention to provide improved coding arrangements for such a television message system and, more particularly, arrangements which extend the range of use of the message system further than that provided by the coding arrangement described above.

As will become clear hereinafter, code signal arrangements embodying the invention operate to assign to each type of transmitted auxiliary message information, a predetermined position in the vertical blanking interval of the regular television program signal and, also, a burst of energy of predetermined frequency. The arrangements further condition the readout device of the receiving unit to record only that message information occupying a blanking interval position and having an identifying frequency burst which corresponds to the information selected for viewing by the home viewer according to a schedule of message categories.

For a better understanding of the present invention, together with further objects thereof, reference is had to the following description taken in connection with the accompanying drawings and with the television message system disclosed in U.S. Pat. No. 3,493,674, and its scope will be pointed out in the appended claims.

Referring to the drawings:

FIG. 1 is a series of waveforms illustrating the vertical blanking interval for alternate fields of an interlaced television signal;

FIG. 3 is a series of auxiliary message representations which are helpful in an understanding of the present invention;

Figure 4:
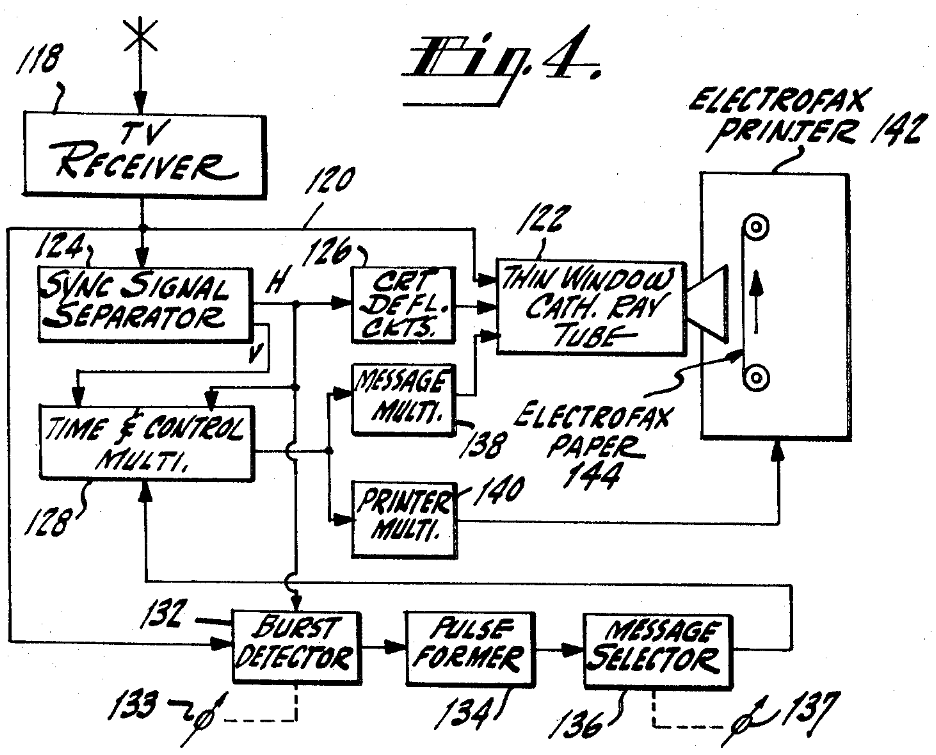
Figure 5:
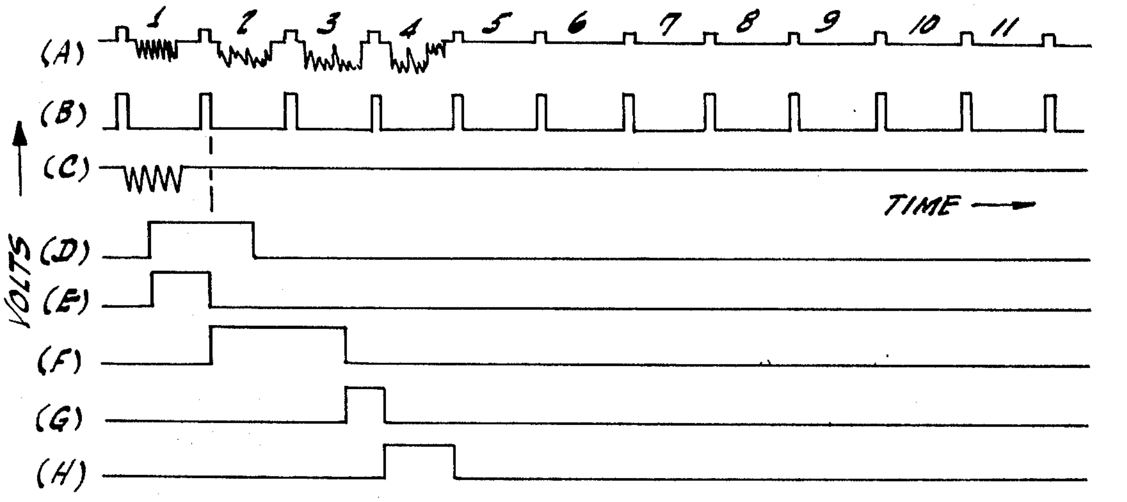

FIG. 4 is a block diagram showing that part of the coding arrangement embodying the invention which conditions the receiving unit to record only that message which occupies a blanking interval position and having an identifying frequency burst corresponding to the information selected for viewing by the home viewer according to a schedule of message categories; and FIG. 5 is a series of waveforms illustrating the operation of the block diagram shown in FIG. 4.

Referring now to FIG. 1, the waveforms A and B respectively illustrate (though not necessarily to scale) the vertical blanking interval for the even and odd fields of the interlaced television signal. As is well known, each of these intervals includes equalizing pulses 30, horizontal synchronizing pulses 32, and serrated vertical synchronizing pulses 34. The equalizing pulses 30 function to maintain vertical synchronization of a television receiver even though two interlaced scanning fields are utilized, while the horizontal synchronizing pulses 32 maintain horizontal synchronization of the receiver during the latter portion of each of the vertical blanking intervals. The serrated vertical synchronizing pulses 34 maintain horizontal synchronization of the receiver during the vertical synchronizing pulse period.

The composite synchronizing signal depicted in waveforms A and B is also used to synchronize the horizontal deflection in the thin window cathode-ray tube of the above-described television message system receiver. When used in such a message system environment, the composite synchronizing signal additionally includes auxiliary video message signals located within the vertical blanking interval, and may further include message-identifying category code signals.

As described in U.S. Pat. Pat. No. 3,493,674, the auxiliary message signals are inserted into the vertical blanking interval during a time interval between successive horizontal synchronizing pulses. The identifying code signals are similarly inserted, but within a different time interval. Transmission of a code signal of frequency $f_1$, for example, in horizontal interval $S_1$ may indicate that transmission of stock market information will follow in a succeeding horizontal interval $S_2$, such as, for example, the next succeeding horizontal interval. Transmission of a code signal of frequency $f_2$ in that $S_1$ interval may then indicate that transmission of civil defense information will be forthcoming in the succeeding horizontal interval $S_2$. Transmission of frequencies $f_3$, $f_4$, etc. in interval $S_1$ may similarly indicate that transmission of other types of auxiliary information are next. It will be apparent that each category of message information in this coding arrangement is characterized by a predetermined frequency—stock market information with frequency $f_1$, civil defense information with frequency $f_2$, etc.

In the coding arrangement of the present invention, on the other hand, each category of message information is characterized by occupying a predetermined position within the vertical blanking interval, as well as by having a predetermined frequency. That such an arrangement can extend the range of use of the television message system still further can also be seen from the waveforms of FIG. 1.

It will be noted from these waveforms that each vertical blanking interval includes 11 spaces between successive horizontal synchronizing pulses. A coding arrangement which inserts a frequency signal $f_1$ into the first space can then assign different message informations to each of the remaining 10 spaces. Stock market listings may, for example, be assigned to the second space, civil defense information to the third space, news of national interest to the fourth space, etc. Alternatively, the civil defense and national news informations may be assigned the same second horizontal space as the stock market quotations, but each with different identifying frequency signals, $f_2$ or $f_3$. It will be apparent that up to 10 types of message informations can then be categorized with each identifying frequency signal. In an embodiment of the invention to be hereinafter described, six different identifying burst frequencies were made available for the first horizontal space in the vertical blanking interval, as were each of the 10 remaining horizontal spaces for the message insertions. Sixty types of messages could thus be categorized. Stock market listings in that embodiment could then be assigned code frequency $f_1$ and blanking interval space 2, civil defense material could be assigned frequency $f_1$ and space 3, and national news could be assigned frequency $f_1$ and space 4. National weather map information could similarly be assigned frequency $f_2$ and horizontal space 2, national sports information could be assigned frequency $f_2$ and space 3, and various special features could be assigned frequency $f_2$ and space 4. As will be described below, only those multiplexed signals having an identifying frequency and a blanking interval position corresponding to the message category selected for viewing will be recorded.

Figure 2:
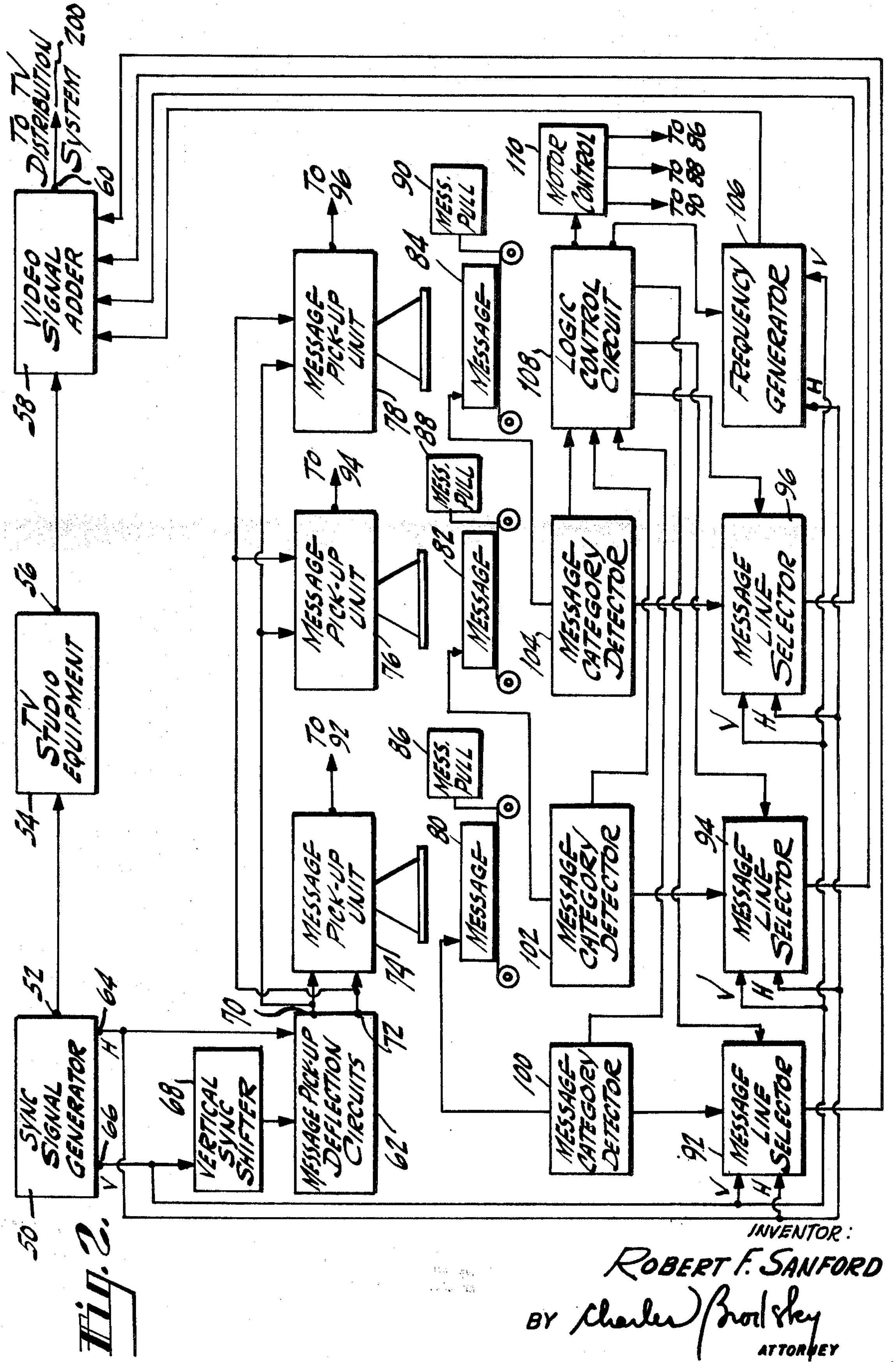
FIG. 2 is a block diagram showing that part of the coding arrangement embodying the invention which assigns predetermined blanking interval positions and predetermined frequency bursts to transmitted auxiliary messages.

Referring now to FIG. 2, the transmitting portion of the television message system there shown is of the general type disclosed in U.S. Pat. No. 3,493,674. It includes a synchronizing signal generator 50 of suitable construction, which develops and supplies at its output terminal 52, drive pulses for the conventional studio equipment, represented as the unit 54. Unit 54 may include a camera chain, a film chain, a slide scanner, a tape recorder, or any other piece of television studio equipment capable of producing a video signal. The video signal developed by unit 54 at its output terminal 56 is the regular television signal and will hereinafter be referred to as the program signal. This program signal is coupled to a video signal adder 58 wherein it is combined with identifying category code signals and with single-line video message signals provided in a manner to be described below. The combined signal appears at output terminal 60 of the adder 58 and is a composite signal in the sense that it comprises a regular program signal during the picture interval of the combined signal, and added coding signals and single line message signals during the vertical blanking interval. The composite video signal developed by the adder 58 at its output terminal 60 is coupled by means of a cable 200 either to a television broadcast transmitter or to any other standard television signal distribution network (not shown). The signal is then transmitted out over the airways in the usual manner.

The synchronizing signal generator 50 also develops synchronizing pulses for a message pickup deflection circuit unit 62, which includes conventional horizontal and vertical rate deflection signal generators. The horizontal synchronizing pulses are developed at output terminal 64 of the generator 50 and are coupled directly to the horizontal deflection signal generator in unit 62. The vertical synchronizing pulses are developed at output terminal 66 of the generator 50 and are coupled to the vertical deflection signal generator in unit 62 through a vertical synchronizing pulse phase shifter 68.

The horizontal and vertical deflection signals developed by the deflection signal generators in unit 62, at its output terminal 70 and 72, respectively, are coupled to message pickup units 74, 76 and 78. Three such units are shown in FIG. 2 for purposes of illustration only. It is to be understood that the number of units employed and controlled by the horizontal and vertical deflection signals will equal the number of horizontal spaces in the vertical blanking interval used for message transmission, If 10 spaces are to be used, so as to establish with six different frequencies, the 60 message categories described above then seven additional pickup units would be required.

The horizontal and vertical deflection signals from the unit 62 drive the message pickup units 74, 76 and 78 just as the signals developed by the generator 50 at its output terminal 52 drive the television studio equipment 54. The message pickup units 74, 76 and 78 may each include a vidicon-type television camera, a slide scanner, or any other type of conventional video pickup device. As shown in FIG. 2, the pickup units 74, 76 and 78 are focused respectively onto messages 80, 82 and 84, each of which is drawn in front of its respective pickup unit by motorized copy puller belts 86, 88 and 90 or other such similar apparatus. The video message signals developed by the pickup units 74, 76 and 78 are coupled to message line selectors 92, 94 and 96.

The message line selectors 92, 94 and 96 are each gated units which sequentially select a predetermined single line of the video message signal from the output signals developed by their respective message pickup units 74, 76 and 78. These message signal lines are then coupled to the video signal adder 58 for distribution along the airways with the program signals. The gating of each of the selector units 92, 94 and 96 is controlled, in part, by internally generated enabling pulses which bear a predetermined time position relative to the vertical pulse developed at output terminal 66 of the synchronizing signal generator 50 and coupled to the units 92, 94 and 96 along with the horizontal pulse developed at the output terminal 64. More particularly, the enabling pulse generated within the selector unit 92 is timed to coincide, for example, with the second space in the vertical blanking interval while the enabling pulses generated within the units 94 and 96 are respectively timed to coincide with the third and fourth such spaces.

The vertical synchronizing pulse phase shifter 68 of FIG. 2 includes a pulse delay network selected to provide a constant phase shift to the vertical synchronizing pulses from the synchronizing signal generator 50 such that the single-line video message signal selected by the units 92, 94 and 96 occurs during its field interval at a point where introduced focus problems are minor—for example, near the middle of the field interval. This phase shift, together with the movement of the messages 80, 82 and 84 in front of their respective pickup units, is such that different and relatively distortion-free lines of message signal information are inserted into each of the three illustrative spaces of the vertical blanking interval.

Before proceeding further with the remainder of the transmitting portion of the television message system of FIG. 2, it would be helpful to consider the auxiliary message picturizations of FIG. 3. Each of these picturizations represents an instantaneous portion of the moving message as it is drawn in front of its associated pickup unit. The line "X" in picturization "3A" represents that line of the message 80 scanned by the pickup unit 74 which will be inserted into the second space of the vertical blanking interval by the line selector unit 92. The line "Y" in picturization "3B" similarly represents that line of the message 82 scanned by the pickup unit 76 which will be inserted into the third space of the blanking interval by the line selector unit 94. Likewise, the line "Z" in picturization "3C" represents that line in the message 84 which will be inserted into the fourth space in the vertical blanking interval due to the combined actions of the units 78 and 96. Picturizations "3D," "3E" and "3F" will be subsequently described.

Each of the picturizations "3A," "3B" and "3C" shows two groups of light reflecting or, alternatively, signal contact strips M and N which indicate the message category being scanned by the pickup units of the system. For purposes of illustration, the group M is assumed to comprise two such strips, $M_1$ (shown solid) and $M_2$ (shown dotted). The group N is similarly assumed to comprise three strips, $N_1$, $N_2$, $N_3$, with one shown solid and the other two shown dotted in each grouping. It is to be understood that a solid-line trip in these picturizations indicates the presence of a reflecting or signal contact strip on the moving message, whereas a dotted line strip indicates the absence of such a strip on the message. The strips are shown located at one side of the message, and extend along the entire length thereof. In the following discussion, it will be understood that one of the two groups, M for example, identifies a frequency to be generated within the transmitting portion of the television message system of FIG. 2, while the other group, N in this case, identifies the space in the vertical blanking interval into which the video message line is to be inserted.

Referring once again to FIG. 2, there are shown three message category detector units 100, 102 and 104, each of which is associated with an auxiliary pickup unit. More particularly, category detector 100 is associated with message pickup unit 74, detector 102 with message pickup unit 76, and detector 104 with pickup unit 78. Each of these detector units may comprise an array of sensing devices (e.g. photodetectors) and matrix-switching arrangements, for example, which are aligned to scan these category strip segments of the moving messages. Upon recognizing the presence of the coded M-strip segment, each detector develops an output signal to control the frequency of a message-identifying signal burst generated by a generator unit 106. The generator 106 is a gated unit subject to control by a logic circuit 108 and by an enabling pulse developed therein which is timed to coincide with the first horizontal space in the vertical blanking interval of the interlaced television signal. The burst thus generated by the gated generator 106 in response to these detector signals is coupled to the video signal adder 58 where it is multiplexed into the first blanking interval space of the composite program signal.

Upon recognizing the presence of the coded N-strip segments, each category detector 100, 102 and 104 also develops an output signal to permit the generation of the enabling pulse within each of its associated message line selector units 92, 94 and 96. The message line information scanned by the appropriate pickup units 74, 76 and 78 will thus be gated through the units 92, 94 and 96 and respectively inserted into their proper second, third and fourth horizontal spaces in the vertical blanking interval. This will be more fully described below.

A motor control unit 110 is also shown in FIG. 2, an is connected between the message copy pullers 86, 88 and 90 and the logic circuit unit 108. The function of this unit 110 will also be described below.

As was previously mentioned, one aspect of the coding arrangement of the present invention assigns each type of message information a predetermined frequency and a predetermined position in the vertical blanking interval. The home viewer can then set his receiver so as to respond only to the burst frequency-blanking interval position combination associated with the transmitted auxiliary message information he desires to record. The manner in which this recording function is accomplished will be described hereinafter with respect to FIG. 4. It will be noted in passing, however, that to do this, the viewer conditions his receiver to produce an enabling pulse for the recording circuits thereof only in response to the proper burst frequency in the first horizontal space in the vertical blanking interval and at a time corresponding to the horizontal space containing the desired message information. A schedule of message codes is provided which indicates to him, the proper frequency and message location of the information of interest.

Consider, now, the operation of the coding arrangement of FIG. 2 which inserts the burst frequency and message information into the vertical blanking interval so as to conform to the schedule of message codes. The frequency insertion will be considered first and the message insertion next.

Assume that the motor control unit 110 is operating the message copy pullers 86, 88 and 90 so that the picturizations "3A," "3B" and "3C" are being scanned by the pickup units 74, 76 and 78 respectively. Assume also that the message detectors 100, 102 and 104 are at this time each scanning the frequency code strip $M_1$ (solid line). Under such situations, the output signals developed by the detectors (in the form of direct voltage enabling signals, for example) condition the logic circuit unit 108 so that a burst of frequency $f_1$ is generated by the unit 106. As previously mentioned, this burst is timed to coincide with the first horizontal space in the vertical blanking interval. It is therefore inserted into that space by the video signal adder 58.

Assume now that the message information of which picturization "3A" represents a portion has been completely scanned by the pickup unit 74 and transmitted at a line per field rate by the message system, and that the message of which picturization "3D" represents a portion is almost in position to be scanned by the unit 74. The picturization "3D" represents a second category of message information which also is to be inserted in the second space of the vertical blanking interval, and is distinguished from the picturization "3A" by having its identifying burst strip $M_1$ located in a different position. It will also be assumed that transmission of the messages represented by picturizations "3B" and "3C" have not yet been completed, they being longer than that represented by picturization "3A".

Under these circumstances, a characteristic of the output signal developed by the detector unit 100, an absence of the direct voltage enabling signal indicating message frequency $f_1$ for example, differs from a like characteristic of the signals developed by the units 102 and 104 (i.e., enabling signal present). This difference is noted by the logic circuit unit 108 which responds in three ways. First, the unit 108 develops and supplies to the motor control unit 110, a signal directing that unit to stop the movement of the message copy puller 86 before picturization "3D" is in position ready to be scanned. Second, the unit 108 supplies an inhibit signal to the message line selector 92 to defeat the enabling pulse otherwise generated therein and to prevent any possible insertion into the vertical blanking interval of the message information represented by the picturization "3D." Third, the logic unit 108 directs the generator 106 to continue to develop a burst signal of frequency $f_1$, which is inserted into its proper blanking interval position. The unit 108 therefore discriminates against the identifying code frequency associated with the message represented by picturization "3D."

When the pickup unit 76, subsequently completes its scanning of the message represented by picturization "3B" and is ready for the next message, that represented by picturization "3E" for example, a similar happening occurs. That is, the difference in location of the frequency indicating solid strip $M_1$ in picturization "3E" is detected by the unit 102, and translated to the logic circuit unit 108. That unit 108 then develops in response another trio of control signals; one, to direct the motor unit 110 to stop the movement of the copy puller 88 before picturization "3E" is in position, a second, to inhibit the message line selector 94 and a third, to continue generation of the $f_1$ frequency burst in unit 106. In this way, also, the frequency and message information associated with picturization "3E" is prevented from being inserted into their blanking interval locations. The generator 106 continues to generate a burst signal of frequency $f_1$ while the "3C" picturization is being scanned by the pickup unit 78.

When the message information represented by that picturization "3C" is completely scanned by the unit 78, the message represented by picturization "3F" is about ready to be scanned next. It will be seen from FIG. 3 that this picturization differs from picturization "3C" also in the location of the frequency indication solid strip $M_1$. The logic circuit unit 108 senses the difference in the signal developed by the detector 104 due to this new location, and responds by instantaneously developing a signal for the motor control unit 110 directing it to stop the movement of the copy puller 90. It similarly develops an inhibit signal for the line selector 96. After the copy puller 90 has slowed somewhat, the circuit 108 automatically supplies a second signal to the motor control unit 110 directing it to start all three copy pullers 86, 88 and 90 once again. In this way, the start of the next message scannings will all be in unison. The circuit 108 also develops an enabling signal for each of the three line selectors 92, 94 and 96. The logic circuit 108, in addition, and in response to the category detector signals now indicating the presence of the $f_2$ frequency-identifying strips, develops a control signal for the generator unit 106 directing it to generate a signal burst of frequency $f_2$ instead of the previous burst of frequency $f_1$. This second burst is then inserted by the adder 58 into the first horizontal space in the vertical blanking interval. The messages represented by the picturizations "3D," "3E" and "3F" are now scanned by the pickup units 74, 76 and 78 and inserted at a line per field rate into their respective blanking interval positions by the combined action of the line selector units 92, 94 and 96 and the video adder 58.

To summarize the insertion of the coding frequency, therefore, it will be seen that he arrangement of FIG. 2 operates to transmit a signal burst of predetermined frequency during the first scansion of message information by the pickup units of the arrangement. After the individual pickup units have all completed their scanning functions, a signal burst of a second predetermined frequency is transmitted. As each individual pickup unit in turn completes its message scanning, the copy puller and the line selector unit associated therewith is deactivated so that when the scanning starts anew, all units begin in synchronism.

Instances may inadvertently arise where several messages having different identifying code frequencies are each before the pickup units 74, 76, 78, ready to be scanned. Such circumstances might occur where the messages to be scanned by a particular pickup unit are arranged out of sequence. The arrangement may be such, for example, that after pickup 74 completely scans picturization "3A," instead of picturization "3D" being ready to be scanned next, a different picturization "3G" (not shown) may be brought into position. Assuming picturization "3G" to have an identifying code frequency $f_3$, then when picturizations "3E" and "3F" are present for scansion, a direct voltage enabling signal corresponding to frequency $f_3$, will be developed by the category detector 100 (instead of one corresponding to the $f_2$ frequency associated with picturization "3D"), while similar signals corresponding to frequency $f_2$ will be developed by each of the detectors 102 and 104. Under such circumstances of nonconforming enabling signals, the logic control unit 108 may be programmed to develop an output signal which inactivates the motor control 110, the frequency generator 106 and the line selectors 92, 94 and 96 while at the same time indicating, as by an alarm signal, the presence of an erroneous message arrangement. When the misarrangement is corrected, by substituting the picturization "3D" for the picturization "3G," the proper sequence of operation will once again be established and the information "3D"—"3F" will be transmitted in turn.

At the same time that the detector units 100, 102 and 104 develop output signals indicating the location in the message of an identifying frequency code strip $M_1$, these units also develop output signals indicating the presence or absence of the coded strip N identifying the space in the vertical blanking interval where the message is to be inserted a line at a time. More particularly: the detector 100 develops in r response to the presence of the identifying strip $N_1$, a control signal for the enabling signal generated within the message line selector unit 92; the detector 102 develops a similar control signal for the message line selection 94 in response to the presence of the strip $N_2$; and the detector 104 develops a similar signal for the line selector unit 96 in response to strip $N_3$ being present in the message. In the absence of its associated coding strip $N_1$, $N_2$ or $N_3$, or in the presence of a strip of improper coding, each of the detectors 100, 102 and 104 operate to develop an inhibit signal for their respective message line selector units. It will be apparent that only when the line selector unit is enabled by this detector control signal, will the message information be inserted into its predetermined space in the vertical blanking interval according to the category schedule.

Referring to FIG. 4, there is shown a general type arrangement of the receiver portion of the television message system disclosed in U.S. Pat. No. 3,493,674. As was previously mentioned, such an arrangement operates to select the individual message lines from the composite video signal transmitted and to record the message information via a thin window cathode-ray tube and an Electrofax printer. More particularly, by so conditioning his receiver in a manner to be described below, the home viewer can control the recording circuits so as to respond only to those messages which have been assigned a burst frequency and a blanking interval location which correspond to the message he desires to view.

Referring now to FIG. 4 in more detail, a television receiver 118 is included and modified slightly so as to make the video signal applied to the kinescope thereof available on an output conductor 120. As was previously mentioned, the video signal includes the regular program portion, the auxiliary message portion and the frequency identify burst signal; with the latter two being included within the vertical blanking interval.

This composite video signal is coupled to a thin window cathode-ray tube 122 to be displayed in a manner to be described below. It is also coupled to a synchronizing signal separator 124, which selects the horizontal and vertical synchronizing signal components from the video signal components on conductor 120. The separator 124 couples the horizontal signal components to a cathode-ray tube deflection circuits unit 126 which provides the necessary beam deflection signals to the thin window tube 122. The separator 124 also couples both he horizontal and vertical signal components to a timing and control monostable multivibrator 128. The video signal obtained on the conductor 120 during the vertical blanking interval has the general waveform shown in "A" of FIG. 5, while the horizontal synchronizing signal components during this interval of the composite video signal is of the waveform shown in "B." It will be noted from waveform "A" that message signal information is assumed to have been transmitted in the second, third, and fourth horizontal spaces of the vertical blanking interval.

The video signal present on the conductor 120 during the vertical blanking interval is further coupled to a burst frequency detector unit 132 which selects the burst frequency signal components in the first horizontal space from the remainder of the video signal. More particularly, the detector 132 is conditioned by the home television viewer. If the home viewer desires to display and record an auxiliary message having assigned to it a signal burst of frequency $f_1$, he then adjusts a frequency control circuit, represented by a knob 133 in FIG. 4, to condition the unit 132 to respond only to a burst of that frequency located in the first horizontal space of the vertical blanking interval. If such a burst is present, the signal developed by the detector 132 will be of the form shown in waveform "C" of FIG. 5. If the burst is present, the signal developed by the detector If the burst is of a different frequency, e.g. $f_2$, no output signal will be developed by the unit 132. (It will be assumed that the burst in the first horizontal space of the vertical blanking interval is of frequency $f_1$ so that the stock market listings, civil defense information and national news respectively occupy the second, third and fourth spaced.)

Assuming that he home viewer wishes to record the latest national news scanned by the news pickup unit 78 (frequency $f_1$, space number four), the signal burst actually present in the first horizontal space will then correspond to the frequency programmed in by the viewer to the detector 13 2 (also $f_1$). In response to the resulting signal developed by the detector 132, a signal having the waveshape shown in "D" of FIG. 5 will be generated within a pulse former unit 134. This unit may also include bistable multivibrator circuitry for developing an output pulse of the type shown in waveform "E" of FIG. 5. It will be noted that the trailing edge of this pulse coincides with the trailing edge of the second horizontal synchronizing pulse of the vertical blanking interval.

The pulse former signal (waveform "E") is then coupled to a message selector unit 136 which represents the other means of home viewer message control. That is, this unit 136 comprises a pulse stretcher type of network which enables the viewer to select the space in the vertical blanking interval corresponding to the message of interest. If the message of interest, according to the schedule of listings, is located in the latter spaces of the vertical blanking interval, then the stretching or increased duration imparted to the pulse signal "E" in response to his manual control of a message selector knob 137, will be greater than the increased duration if it were in the beginning spaces of the interval. For the desired national news message located in the fourth horizontal space, the output pulse of unit 136 may appear as shown in waveform "F" of FIG. 5. As shown in FIG. 4, this pulse is also coupled to the monostable multivibrator 128. I will be noted that the leading edge of this pulse coincides with the trailing edge of the pulse signal represented by waveform "E."

In response to the synchronizing signal components coupled to it from the separator unit 124, and to the pulse from the message selector unit 136, the multivibrator unit 128 develops an output signal of the type shown in waveform "G" of FIG. 5. It will be noted that the leading edge of this pulse coincides with the trailing edge of the stretched pulse (waveform "F"), and that the trailing edge of the multivibrator generated pulse coincides with the trailing edge of the horizontal synchronizing pulse which next follows the stretched pulse in time.

The pulse signal developed by the multivibrator 128 is then coupled to a message line multivibrator 138, which is actuated by the trailing edge of the applied pulse signal. The message line multivibrator 138 is set to develop, in response, a pulse signal having a duration substantially equal to the period between two successive horizontal synchronizing pulses. It will be noted from waveform "H" of FIG. 5, that the pulse signal thus developed by the multivibrator 138 coincides with the fourth horizontal space in the vertical blanking interval, in which space the desired national news message information has been inserted. This pulse signal is coupled to the control grid of the thin window tube 122, to intensify the electron beam thereof at the time the message video information in the fourth horizontal space is applied from conductor 120 to the cathode of the thin window tube 122. Under the influence of the horizontal deflection signals from the unit 126, a line of national news message information will thus be displayed on the face of the thin window tube 122.

The pulse signal from the timing and control multivibrator 128 is also coupled to a printer multivibrator 140. This unit couples to the copy pull motor and related equipments of an Electrofax printer 142 and advances the Electrofax paper 144 in front of the face of the tube 122. In this manner, the auxiliary national news information displayed by the tube 122 will be permanently recorded on the paper 144. The pulse duration of the multivibrator 140 is set such that the Electrofax paper 144 will continue to advance for about 4 seconds after the message recording has been completed This enables sufficient paper to run through the printer so that home viewer can observe what has in fact been recorded. (It will be noted that if the paper advancement were halted upon completion of the message recordation, the exposed paper would not have advanced sufficiently through the developer and takeup reel sections of the printer to permit a visible readout.) Should the message length be such as to exceed the 4-speed period of the multivibrator 140, the pulse signal from the multivibrator 128 which next follows the 4-second interval will reset the multivibrator 140 for another 4 seconds, and will continue to do so on until the message transmission is complete and the desired information is recorded. This completion of national news transmission effectively completes the transmission of messages of $f_1$ category codes. Subsequent $f_2$ category codes will then produce no burst detector signal, they being of a different frequency from that programmed in by the viewer through control 133, and no resulting multivibrator pulse will be developed to reset the multivibrator 140. The Electrofax paper 144 will thus be advanced for 4 seconds only, after the recording of the last line of national news information, at which time printer 142 turns off.

While the previous arrangement has been described as using a message and code signal insertion scheme by which a code signal was inserted into the first horizontal space in the vertical blanking interval, the arrangement could just as easily operate where the code signal is inserted in a different horizontal stage. It will be appreciated, however, that such a change reduces the number of message categories which the multiplex system can handle. For example, with the code signal being inserted into the third horizontal space and with the same six identifying burst frequencies, the maximum number of categories available with this scheme will be reduced from 60 to 48. If the last three horizontal spaces of the vertical blanking interval were continued to be reserved for test purposes, as at present, and therefor not available for broadcast service, the number of message categories will be further reduced to 30. It will also be appreciated that by relating the generation of the intensifying pulse for the thin window tube 122 to the horizontal synchronizing pulses of the vertical blanking interval (whose positions within that interval are precisely controlled at the transmitter), proper "keying" of the tube is furthered, even in the presence of component variations which might otherwise affect the initiation and/or termination of the generated pulses and, therefore, the time during which the electron beam of the tube 122 is to be intensified.

What I claim is:

1. For use in conjunction with a television message system of the type wherein message representative line scan video signals are developed by an auxiliary video pickup device and sequentially multiplexed with regular television program video signals developed by a primary video pickup device during the vertical blanking interval thereof at a rate of one line scan signal per message information per field of program information and wherein said message information includes message category information identifying the message as to content, apparatus comprising:

first means responsive to said message category information for producing output signals assigning each of said line scan signals a predetermined position within said vertical blanking interval, and a predetermined category code signal identifying said line scan signal, second means responsive to said output signals from said first means for inserting a category code signal into an earlier horizontal interval of said vertical blanking interval so as to identify a plurality of message line signals inserted in later vertical blanking intervals, and third means responsive to said output signals from said first means for inserting said line scan signals having the same identifying category code frequency but different horizontal interval positions into their predetermined position within said vertical blanking interval according to a predetermined schedule, said second and third means operable to increase the message transmission capabilities of the system to a number equal to the number of unique code signals utilized, multiplied by the number of vertical blanking intervals utilized for message line insertion.

2. Apparatus as defined in claim 1 wherein each of said category code signals identifying said message representative line scan signals as to type is also assigned to predetermined position within said vertical blanking interval.

3. Apparatus as defined in claim 2 wherein each of said category code signals is assigned the same predetermined position within said vertical blanking interval.

4. Apparatus as defined in claim 2 wherein each of said category code signals comprises a burst of energy of predetermined frequency.

5. Apparatus as defined in claim 3 wherein each of said category code signals comprises a burst of energy of predetermined frequency which is assigned an earlier position in said vertical blanking interval than is assigned to said message representative line scan signals.

6. Apparatus as defined in claim 5 wherein each of said message informations is classified according to its respective subject matter and wherein said first means includes:

means for detecting said message information classifications;

means for generating said line scan signals representative of said message informations;

means coupled to said detecting means for generating said category code signals identifying said line scan signals according to said classifications;

means for multiplexing said line scan signals and said category code signals into predetermined portions of said vertical blanking interval; and means coupled to said detecting means for gating predetermined ones of said line scan signals and said category code signals to said multiplexing means in accordance with said classification to be inserted into the vertical blanking interval thereby.

7. A system as defined in claim 1 and further comprising:

motor control means, and logic control circuit means coupled to said motor control means and to said first means for moving said message information across the field of view of said auxiliary pickup device when the corresponding identifying code frequency is being inserted into said vertical blanking interval and for preventing the moving of said message information when a noncorresponding code frequency is being generated and inserted into said vertical blanking interval.

8. For use in conjunction with a television message system of the type wherein message representative line scan video signals developed by an auxiliary video pickup device are classified according to their respective subject matter and sequentially multiplexed with regular television program video signals developed by primary video pickup device during the vertical blanking interval thereof at a rate of one line scan signal per message information per field of program information and are displayed at said rate by a cathode-ray tube, apparatus comprising;

first means responsive to said message information for assigning to each of said line scan signals a predetermined position within said vertical blanking interval blanking interval and a predetermined category code signal identifying said line scan signals as to type, said first means including:

means for detecting message information classifications, means for generating line scan signals representative of message information, means coupled to said detecting means for generating category code signals which comprise a burst of energy of predetermined frequency and which identify said line scan signals according to said classifications, means for inserting said code signals in the same predetermined position in said vertical blanking interval during an earlier horizontal interval of said blanking interval, means for multiplexing said line scan signals into predetermined ones of the remaining later horizontal intervals of said vertical blanking interval, means coupled to said detecting means for gating predetermined ones of said line scan signals and said category code signals to said multiplexing means in accordance with said classification to be inserted into the vertical blanking interval thereby, and second means for recording that line scan signal occupying a blanking interval position and having an identifying code signal which corresponds to the message information selected for viewing according to a schedule of message categories, said second means including:

means for detecting said category code signals and for providing an output indication thereof when said signals correspond to category code signals selected for viewing according to a schedule of message categories, means responsive to said output indications for generating a gating signal which is substantially time coincident with that portion of said vertical blanking interval into which are multiplexed those line scan signals selected for viewing according to said message signals, means for coupling said multiplex signals to said cathode-ray tube to be displayed thereby, and means for coupling said gating signal to said cathode-ray tube to intensify the electronic beam thereof during the time of application of said gating signal to said tube.

9. Receiving apparatus for a television message system of the type wherein the transmitted signal is a sequentially multiplexed signal including primary program image signals, and auxiliary message image signals and category code signals identifying said image signals as to type included within predetermined portions of the vertical blanking interval of said program signals comprising;

first means for receiving said multiplexed signals, second means for displaying message image signals corresponding to a preselected code signal being present in each multiplexed signal, third means for coupling said received multiplexed signals to said second means, fourth means responsive to said preselected code signal being present within said vertical blanking interval and selected according to a schedule of message informations for energizing said second means to display those auxiliary message signals associated with the presence of said identifying code within said blanking interval, and fifth means for providing a substantially permanent record of said displayed auxiliary message information, wherein said fifth means initiates the permanent recording of said auxiliary message information upon initial receipt thereof and terminated said permanent recording a predetermined time interval after complete receipt of said message information.

10. Receiving apparatus for a television message system of the type wherein the transmitted signal is a sequentially multiplexed signal including primary program image signals, and auxiliary message image signals and category code signals identifying such image signals as to type included within predetermined portions of the vertical blanking interval of said program signals comprising:

first means for receiving said multiplexed signals, second means including an electronic beam display device for displaying message image signals corresponding to a preselected code signal being present in each multiplexed signal, third means for coupling said received multiplexed signals to said second means, and fourth means responsive to said preselected code signal being present within said vertical blanking interval and selected according to a schedule of message informations, said fourth means including means for generating a pulse signal in response to the presence of said preselected code signal within said vertical blanking interval for energizing said second means to intensify said electron beam substantially at a time when said auxiliary signal is coupled to said display device thereby to display those auxiliary message signals associated with the presence of said identifying code within category code.

UNITED STATES PATENT OFFICE
CERTIFICATE OF CORRECTION

Patent No. 3,585,290 Dated June 15, 1971

Inventor(X) Robert F. Sanford

It is certified that error appears in the above-identified patent and that said Letters Patent are hereby corrected as shown below:

Column 2, Line 33, delete "U.S. Pat. Pat. No." and insert --Patent--. Column 4, Line 60, delete "trip" and insert --strip--. Column 7, Line 46, after "in" delete the letter "r". Column 7, Line 50, delete "selection" and insert --selector--. Column 8, Line 14, delete "he" and insert --the--. Column 8, Lines 38-39, delete "If the burst is present, the signal developed by the detector". Column 8, Line 45, delete "spaced" and substitute --spaces--. Column 8, Line 75, delete "I" and substitute --It--. Column 9, Line 47, after "4" delete "speed" and insert --second--. Column 11, Lines 30-31, delete "blanking interval".

Signed and sealed this 7th day of December 1971.

(SEAL)
Attest:

EDWARD M.FLETCHER,JR.
Attesting Officer

ROBERT GOTTSCHALK
Acting Commissioner of Patents